United States Patent
Roessel et al.

(10) Patent No.: US 8,948,110 B2
(45) Date of Patent: Feb. 3, 2015

(54) APPARATUS AND METHOD FOR SCHEDULING IN CARRIER AGGREGATED COMMUNICATION SYSTEMS BASED ON A TRANSMIT-RECEIVE-FREQUENCY GAP BAND

(75) Inventors: Sabine Roessel, München (DE); Frank Frederiksen, Klarup (DK); Klaus Ingemann Pedersen, Aalborg (DK); Jeroen Wigard, Klarup (DK)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

(21) Appl. No.: 13/521,601

(22) PCT Filed: Jan. 12, 2010

(86) PCT No.: PCT/EP2010/050269
§ 371 (c)(1),
(2), (4) Date: Oct. 2, 2012

(87) PCT Pub. No.: WO2011/085804
PCT Pub. Date: Jul. 21, 2011

(65) Prior Publication Data
US 2013/0021990 A1   Jan. 24, 2013

(51) Int. Cl.
*H04B 15/00* (2006.01)
*H04L 5/00* (2006.01)

(52) U.S. Cl.
CPC .............. *H04L 5/0091* (2013.01); *H04L 5/001* (2013.01); *H04L 5/0035* (2013.01);
(Continued)

(58) Field of Classification Search
USPC .................................. 370/329, 328, 310, 341
See application file for complete search history.

(56) References Cited

U.S. PATENT DOCUMENTS

| 6,061,568 | A | 5/2000 | Dent | 455/450 |
| 7,693,429 | B1 * | 4/2010 | Lowery | 398/192 |

(Continued)

FOREIGN PATENT DOCUMENTS

| JP | 2001177486 A | 6/2001 |
| JP | 2006287624 A | 10/2006 |

OTHER PUBLICATIONS

3GPP TS 36.211 V9.0.0 (Dec. 2009), "3rd Generation Partnership Project; Technical Specification Group Radio Access Network; Evolved Universal Terrestrial Radio Access (E-UTRA); Physical channels and Modulation (Release 9)", 85 pgs.

(Continued)

*Primary Examiner* — Andrew Lai
*Assistant Examiner* — Zhiren Qin
(74) *Attorney, Agent, or Firm* — Martin & Ferraro, LLP

(57) ABSTRACT

An apparatus, method, system and computer program product is configured for avoiding base station self-interference due to transmit intermodulation in carrier aggregated communication systems. Physical downlink communication channels are allocated to respective component carriers per time interval according to a communication service in which communication is performed on an aggregation of component carriers of one or more frequency band such that component carriers to be used for transmission are separated from component carriers to be used for receiving by a transmit-receive-frequency gap band. However, not all available component carriers to be used for transmission are allocated in the same time interval. Rather, in each time interval, the physical downlink communication channels to be allocated for transmission are allocated to the available component carriers to be used for transmission such that, in each frequency band, the overall emission spectrum does not reach beyond the transmit-receive-frequency gap band.

18 Claims, 7 Drawing Sheets

(52) U.S. Cl.
CPC .......... *H04L 5/0062* (2013.01); *H04L 5/0066* (2013.01); *H04L 5/0073* (2013.01); *H04L 5/0007* (2013.01); *H04L 5/0032* (2013.01); *H04L 5/0053* (2013.01)
USPC ........................................................ 370/329

(56) References Cited

U.S. PATENT DOCUMENTS

| | | | | |
|---|---|---|---|---|
| 2006/0281404 | A1* | 12/2006 | Lee et al. ..................... | 455/11.1 |
| 2009/0227263 | A1* | 9/2009 | Agrawal et al. ............ | 455/452.1 |
| 2009/0252075 | A1* | 10/2009 | Ji et al. ......................... | 370/312 |
| 2010/0304785 | A1* | 12/2010 | Marlett et al. ............. | 455/552.1 |
| 2011/0182377 | A1 | 7/2011 | Fujii et al. .................... | 375/267 |
| 2011/0243088 | A1* | 10/2011 | Ahn et al. .................... | 370/329 |

OTHER PUBLICATIONS

3GPP TS 36.212 V9.0.0 (Dec. 2009), "3rd Generation Partnership Project; Technical Specification Group Radio Access Network; Evolved Universal Terrestrial Radio Access (E-UTRA); Multiplexing and channel coding (Release 9)", 61 pgs.

3GPP 36.213 V9.0.1 (Dec. 2009), "3rd Generation Partnership Project; Technical Specification Group Radio Access Network; Evolved Universal Terrestrial Radio Access (E-UTRA); Physical layer procedures (Release 9)", 79 pgs.

R4-093091, 3GPP TSG RAN WG4 Meeting #52, Shenzhen, CN, Aug. 24-28, 2009, "Reducing HeNB interference to Macro eNB control channels", Motorola, 2 pgs.

R4-093220, 3GPP TSG-RAN WG4 Meeting #52, Shenzhen, China, Aug. 24-28, 2009, "Heterogeneous Support for Reliable Downlink Control", Motorola, 7 pgs.

R4-093439, 3GPP TSG-RAN WG4 Meeting #52, Shenzhen China, Aug. 24-28, 2009, "Way forward on Henb interference management", CMCC, et al., 2 pgs.

R4-095019, 3GPP TSG-RAN WG4 Meeting #53, Jeju, Korea, Nov. 9-13 2009, "LTE FDD Home eNoceB RF requirements TR 36.9xxxV0.2.0", Motorola, 24 pgs.

R2-083338, 3GPP TSG RAN WG2 #62bis Meeting, Warsaw, Poland, Jun. 30-Jul. 4, 2008, "Measurement Reporting for Inter-cell Interference Coordination (ICIC)", Alcatel-Lucent, 6 pgs.

Baker, Matthew et al., "Chapter 9, Downlink Physical Data and Control Channels," Jan. 1, 2009, LTE—The UMTS Long Term Evolution: From Theory to Practice, John Wiley & Sons, Ltd, pp. 181-206, XP002576365.

Samsung, 3GPP TSG RAN WG4 Meeting #51, R4-091719, "LTE-A carrier aggregation DL harmonics and inter-modulation," San Francisco, CA, US, May 4-8, 2009, 5 pages, XP050342463.

Ericsson, TSG-RAN Working Group 4"(Radio) meeting #50bis, R4-091285, Carrier aggregation: some UE aspects," Seoul, South Korea, Mar. 23-27, 2009, 7 pages, XP050342060.

NTT Docomo et al., 3GPP TSG-RAN WG4 Meeting #53, R4-094272, "Correction to the transmitter intermodulation," Jeju, Korea, Nov. 9-13, 2009, 4 pages.

\* cited by examiner

APPARATUS AND METHOD FOR SCHEDULING IN CARRIER AGGREGATED COMMUNICATION SYSTEMS BASED ON A TRANSMIT-RECEIVE-FREQUENCY GAP BAND

FIELD OF THE INVENTION

The present invention relates to an apparatus, method, system and computer program product for avoiding base station self-interference due to transmit intermodulation in carrier aggregated communication systems.

RELATED BACKGROUND ART

Prior art which is related to this technical field can e.g. be found by the technical specifications TS 36.211 current version: 9.0.0), TS 36.212 (current version 9.0.0), and TS 36.213 (current version: 9.0.1) of the 3GPP, and by the contributions according to document R4-093091, document R4-093220 and document R4-093439 of the working group 4 of the 3GPP related to radio access networks.

The following meanings for the abbreviations used in this specification apply:
3GPP: 3$^{rd}$ Generation Partnership Project
CC: Component Carrier
DL: Downlink
eNB: evolved Node B (eNode B)
GSM: Global System for Mobile Communication
HARQ: Hybrid Automatic Repeat Request
ICIC: Inter-Cell Interference Coordination
LTE: Long Term Evolution
OFDMA: Orthogonal Frequency Division Multiple Access
PBCH: Physical Broadcast Channel
PCFICH: Physical Control Format Indicator Channel
PDCCH: Physical Downlink Control Channel
PDSCH: Physical Downlink Shared Channel
PHICH: Physical HARQ Indicator Channel
PS: Public Safety
PSS: Primary Synchronization Channel
PUSCH: Physical Uplink Shared Channel
RRC: Radio Resource Control
SC-FDMA: Single Carrier Frequency Division Multiple Access
SFN: Sub-Frame Numbering
SSS: Secondary Synchronization Channel
TTI: Transmission Time Interval
UE: User Equipment
UL: Uplink In recent years, 3GPP's LTE as the upcoming standard is under particular research. The base station of LTE is called eNodeB. LTE is expected to be based on OFDMA in downlink and SC-FDMA in uplink. Both schemes allow the division of the uplink and downlink radio resources in frequency and time, i.e. specific frequency resources will be allocated for certain time duration to the different UE. The access to the uplink and downlink radio resources is controlled by the eNode B that controls the allocation of the frequency resources for certain time slots.

As a further development of LTE, an extension of transmission bandwidth is considered. This evolution of LTE, referred to as LTE-advanced, aims at exploiting spectrum allocations up to 100 MHz. Though, this bandwidth extension is made while preserving spectrum compatibility, which is achieved with so-called carrier aggregation, where multiple component carriers are aggregated to provide the necessary bandwidth.

However, by e.g. referring to the example of lower and upper 700 MHz frequency band as used in the United States, when all DL CCs of two different frequency bands (e.g. Band 12 and Band 14, see FIG. 1) or when all DL CCs of a small duplex gap band are active at the same time, potential transmit and receive intermodulation products potentially cause intermodulation-based duplex interference into the eNB's own receiver(s) (and potentially also into the receivers of other networks or devices).

If (which may be an even more probable case) the different aggregated carriers have separate RF hardware/chains, intermodulation duplex interference is either avoided by so-called diplexers—which are at their technical limits in case of wide LTE channels—, or by costly additional antennas.

FIG. 1 illustrates this problem of intermodulation duplex interference—inter-frequency band, where eNB self-interference is caused by combining Band 12 and Band 14 on a same antenna polarization plane, in which case a hardware-based solution (i.e. using diplexer) can be quite challenging. However, as indicated above, FIG. 1 only serves as an example for illustrating the problem which is not restricted to the case of Band 12/Band 14 caused interference.

SUMMARY OF THE INVENTION

It is an object of the present invention to overcome at least some of the drawbacks of the prior art.

According to a first aspect of the present invention, this is accomplished by an apparatus, comprising scheduling means configured to schedule allocation of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein the scheduling means is further configured so that not all available component carriers to be used for transmission are allocated in the same time interval, and wherein the scheduling means is further configured so that, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the first aspect may be as follows.

The apparatus according to the first aspect may be configured to be suitable for avoiding base station self-interference due to transmit intermodulation in carrier aggregated communication systems.

The physical downlink communication channels can comprise a physical channel for broadcast communication and a primary and a secondary synchronization channel.

The physical downlink communication channels can comprise a physical channel configured for downlink control, and the apparatus can further comprise radio resource control means configured to exclude certain component carriers to be used for transmission from having allocated the physical channel configured for downlink control; and allocation communicating means configured to communicate, on a component carrier which is not excluded by the radio resource control means, information that the excluded component carriers are not to be monitored, allocation of a physical channel configured for shared uplink use to a component carrier to be used for receiving and allocation of a physical channel configured for shared downlink use to a component carrier to be used for transmission, wherein the scheduling means can be further configured to allocate, for consecutive time intervals, the physical channel configured for downlink control to not excluded component carriers to be used for transmission.

The physical downlink communication channels can comprise a physical channel configured for hybrid automatic repeat request indication, and the scheduling means can be further configured to exclude those component carriers to be used for transmission from having allocated the physical channel configured for hybrid automatic repeat request indication which are excluded by the radio resource control means from having allocated the physical channel configured for downlink control.

The physical downlink communication channels can comprise a physical control channel configured for format indication, and the scheduling means can be further configured to exclude those component carriers to be used for transmission from having allocated the physical control channel configured for format indication which are excluded by the radio resource control means from having allocated the physical channel configured for downlink control.

The physical downlink communication channels can comprise a physical channel configured for shared downlink use.

The scheduling means can be further configured to apply dynamic downlink inter-cell interference coordination.

According to a second aspect of the present invention, the object is accomplished by an apparatus, comprising scheduling means configured to schedule allocation of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein the scheduling means is further configured so that not all available component carriers to be used for transmission are allocated in the same time interval with maximum transmission power, and wherein the scheduling means is further configured so that, in each time interval, the physical downlink communication channels to be allocated for transmission are allocated to the available component carriers to be used for transmission such that, in each frequency band, the overall emission spectrum does not reach beyond the transmit-receive-frequency gap band.

According to a third aspect of the present invention, the object is accomplished by an apparatus, comprising a scheduling processor configured to schedule allocation of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein the scheduling processor is further configured so that not all available component carriers to be used for transmission are allocated in the same time interval, and wherein the scheduling processor is further configured so that, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the third aspect of the present invention may correspond to the modifications of the first aspect.

According to a fourth aspect of the present invention, the object is accomplished by an apparatus, comprising a scheduling processor configured to schedule allocation of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein the scheduling processor is further configured so that not all available component carriers to be used for transmission are allocated in the same time interval with maximum transmission power, and wherein the scheduling processor is further configured so that, in each time interval, the physical downlink communication channels to be allocated for transmission are allocated to the available component carriers to be used for transmission such that, in each frequency band, the overall emission spectrum does not reach beyond the transmit-receive-frequency gap band.

According to a fifth aspect of the present invention, the object is accomplished by a method, comprising allocating physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein not all available component carriers to be used for transmission are allocated in the same time interval, and wherein, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the fifth aspect may be as follows.

The method according to the fifth aspect may be configured to be suitable for avoiding base station self-interference due to transmit intermodulation in carrier aggregated communication systems.

The physical downlink communication channels can comprise a physical channel for broadcast communication and a primary and a secondary synchronization channel.

The physical downlink communication channels can comprise a physical channel configured for downlink control, and the method can further comprise excluding certain component carriers to be used for transmission from having allocated the physical channel configured for downlink control; communicating, on a component carrier which is not excluded by the radio resource control means, information that the excluded component carriers are not to be monitored, allocation of a physical channel configured for shared uplink use to a component carrier to be used for receiving and allocation of a physical channel configured for shared downlink use to a component carrier to be used for transmission; and allocating, for consecutive time intervals, the physical channel configured for downlink control to not excluded component carriers to be used for transmission.

The physical downlink communication channels can comprise a physical channel configured for hybrid automatic repeat request indication, and the method can further comprise excluding those component carriers to be used for transmission from having allocated the physical channel configured for hybrid automatic repeat request indication which are excluded from having allocated the physical channel configured for downlink control.

The physical downlink communication channels can comprise a physical control channel configured for format indication, and the method can further comprise excluding those component carriers to be used for transmission from having allocated the physical control channel configured for format indication which are excluded from having allocated the physical channel configured for downlink control.

The physical downlink communication channels can comprise a physical channel configured for shared downlink use.

The method can further comprise applying dynamic downlink inter-cell interference coordination.

The method according to the fifth aspect or any of its modifications may be performed by the apparatus according to the first or third aspect or suitable ones of their modifications.

According to a sixth aspect of the present invention, the object is accomplished by a method, comprising allocating of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein not all available component carriers to be used for transmission are allocated in the same time interval with maximum transmission power, and wherein, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the sixth aspect may be as follows.

The method according to the sixth aspect may be configured to be suitable for avoiding base station self-interference due to transmit intermodulation in carrier aggregated communication systems.

The method according to the sixth aspect or any of its modifications may be performed by the apparatus according to the second or fourth aspect or suitable ones of their modifications.

According to a seventh aspect of the present invention, the object is accomplished by an evolved Node B, comprising an apparatus according to the first to fourth aspect of the present invention or any one of their modifications.

According to a eighth aspect of the present invention, the object is accomplished by a computer program product comprising computer-executable components which perform, when the program is run on a computer, allocating physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein not all available component carriers to be used for transmission are allocated in the same time interval, and wherein, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the eighth aspect may be as follows.

The computer program product according to the eighth aspect may be suitable for avoiding base station self-interference due to transmit intermodulation in carrier aggregated communication systems.

The computer program product according to the eighth aspect may be embodied as a computer-readable storage medium.

Otherwise, modifications of the eighth aspect may correspond to the modifications of the fifth aspect.

According to a ninth aspect of the present invention, the object is accomplished by a computer program product comprising computer-executable components which perform, when the program is run on a computer, allocating of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein not all available component carriers to be used for transmission are allocated in the same time interval with maximum transmission power, and wherein, in each time interval, the physical downlink communication channels to be allocated for transmission are allocated to the available component carriers to be used for transmission such that, in each frequency band, the overall emission spectrum does not reach beyond the transmit-receive-frequency gap band.

Modifications of the ninth aspect may be as follows.

The computer program product according to the ninth aspect may be suitable for avoiding base station self-interference due to transmit intermodulation in carrier aggregated communication systems.

The computer program product according to the ninth aspect may be embodied as a computer-readable storage medium.

Otherwise, modifications of the ninth aspect may correspond to the modifications of the sixth aspect.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, avoidance of self-interference due to transmitter intermodulation in carrier aggregated communication systems such as e.g. based on LTE-Advanced is described. However, it should be appreciated that these exemplary embodiments are not limited for use among these particular types of wireless communication systems, and according to further exemplary embodiments, the present invention can be applied also to other types of communication systems and access networks in which the problem of self-interference due to transmitter intermodulation occurs.

Thus, certain embodiments of the present invention relate to mobile wireless communication systems, such as 3GPP LTE and 3GPP LTE-Advanced. In more detail, certain embodiments of the present invention are related to the configuration of an LTE eNB and components thereof, such as a scheduler element or the like.

However, as indicated above, the present invention is not limited to eNB, but other embodiments of the present invention are related to base station nodes and components thereof.

Figure 7:
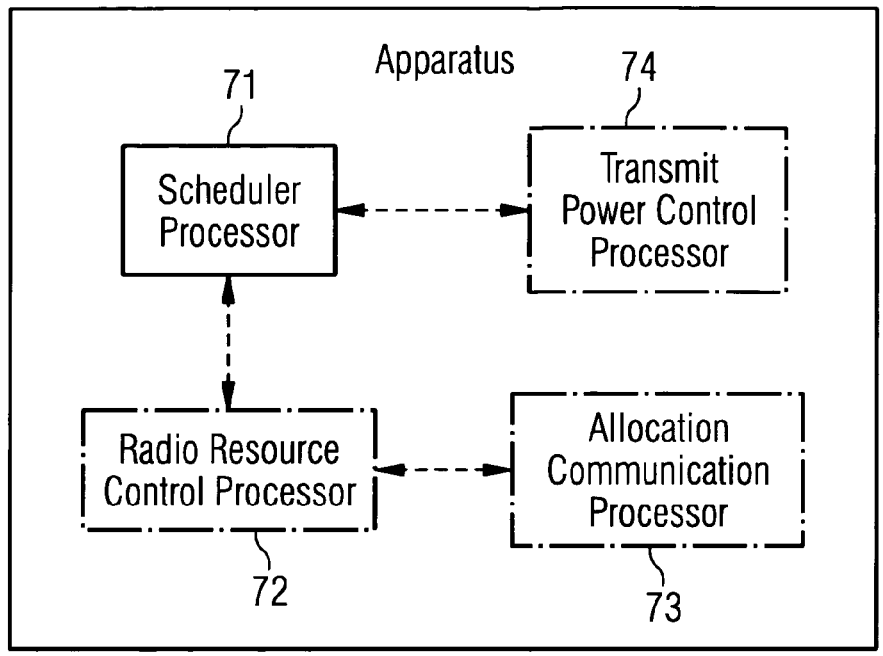
FIG. 7 shows an apparatus according to certain embodiments of the present invention.

FIG. 7 shows a principle configuration of an example for an apparatus according to certain embodiments of the present invention. One option for implementing this example for an apparatus according to certain embodiments of the present invention would be a component such as a scheduler in an evolved Node B according to LTE.

Specifically, as shown in FIG. 7, the example for an apparatus comprises a scheduling processor 71 configured to schedule allocation of physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band, wherein the scheduling processor is further configured so that not all available component carriers to be used for transmission are allocated in the same time interval, and wherein the scheduling processor is further configured so that, in each time interval, the physical downlink communication channels to be allocated for transmission are allocated to the available component carriers to be used for transmission such that, in each frequency band, the overall emission spectrum does not reach beyond the transmit-receive-frequency gap band.

According to needs, modifications of the above described apparatus may include that additionally a radio resource control processor 72, an allocation communication processor 73, and a transmit power control processor 74 are included, either alternatively or in any combination.

Figure 8:
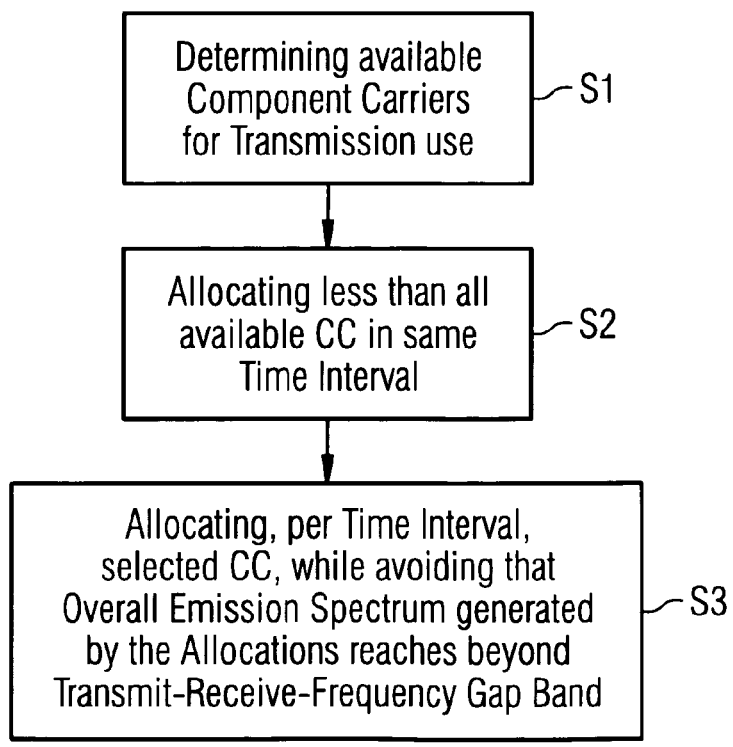
FIG. 8 shows a flow chart illustrating a method according to certain embodiments of the present invention.

FIG. 8 shows a principle flowchart of an example for a method according to certain embodiments of the present invention. That is, as shown in FIG. 8, this method comprises allocating (S1) physical downlink communication channels to respective component carriers per time interval according to a communication service in which communication is performed on an aggregation of component carriers of one or more frequency band such that component carriers to be used for transmission are separated from component carriers to be used for receiving by a transmit-receive-frequency gap band (which effectively may include that the available component carriers to be used for transmission are determined), wherein not all available component carriers to be used for transmission are allocated (S2) in the same time interval, and wherein, in each time interval, the physical downlink communication channels to be allocated for transmission are allocated (S3) to the available component carriers to be used for transmission such that, in each frequency band, the overall emission spectrum does not reach beyond the transmit-receive-frequency gap band.

As a modification, instead of not at all allocating an available component carrier to be used for transmission, such available component carrier to be used for transmission may be allocated, but with a suitable lower than maximum transmission power.

One option for performing the example of a method according to certain embodiments of the present invention would be to use the apparatus as described above or a modification thereof which becomes apparent from the embodiments as described herein below.

According to certain embodiments of the present invention, both the above described apparatus as well as the above described method cam be implemented such that the set of used transmit component carriers is optimized with respect to the overall emission spectrum. That is, the physical downlink communication channels to be allocated for transmission are allocated to the available component carriers to be used for transmission such that the overall emission spectrum does not reach beyond the transmit-receive-frequency gap band. The term "does not reach beyond the transmit-receive-frequency gap band" is to be understood such that any receiving unit configured for receiving a frequency band beyond this gap is not negatively affected. As a receiving unit, for example a receiver unit of an eNB according to the LTE/LTE-Advanced specifications may be taken. In many cases, the above may be achieved if the physical downlink communication channels to be allocated for transmission are allocated to the available component carriers to be used for transmission such that in each frequency band, the set of used component carriers is as far as possible from a transmit-receive-frequency gap band, for example regardless of how many component carriers are actually to be used (while still complying with the premise that not all available component carriers to be used for transmission are allocated in the same time interval).

In the following, for illustration purposes, certain embodiments of the present invention are described by referring to the wide downlink component carrier area of the lower and upper 700 MHz frequency band (Band 12/Band 14) as e.g. used in the United States. However, the present invention is by no means limited to these frequency bands and may be applied to other examples of carrier aggregation as well.

Furthermore, certain embodiments of the present invention may be used in addition to measures proposed in the prior art such as a hardware based solution.

Specifically, according to certain embodiments of the present invention, intermodulation-caused eNB self-interference is dynamically or semi-statically avoided by combining various time-multiplexing muting and cross-CC scheduling steps differentiated with respect to different channels on the physical layer on an otherwise backward-compatible carrier.

Accordingly, communication may be performed on an aggregation of at least two component carriers of one or more frequency bands in such a way that potential intermodulation interference into the receive spectrum portions—caused by a reverse alignment of transmission and receive spectrum portions of at least two frequency bands or by a small duplex gap in at least one frequency band or by a combination of both or by neighboring FDD and TDD spectrum portions—is avoided.

According to certain embodiments of the present invention, it is considered that the dominant cause for duplex interference are $3^{rd}$ order (and to some extend $5^{th}$ order) intermodulation products. Hence, limiting the frequency range of $3^{rd}$ order (and potentially of $5^{th}$ order) intermodulation products will in these cases significantly lower the receiver desensitization due to duplex interference.

Figure 1:
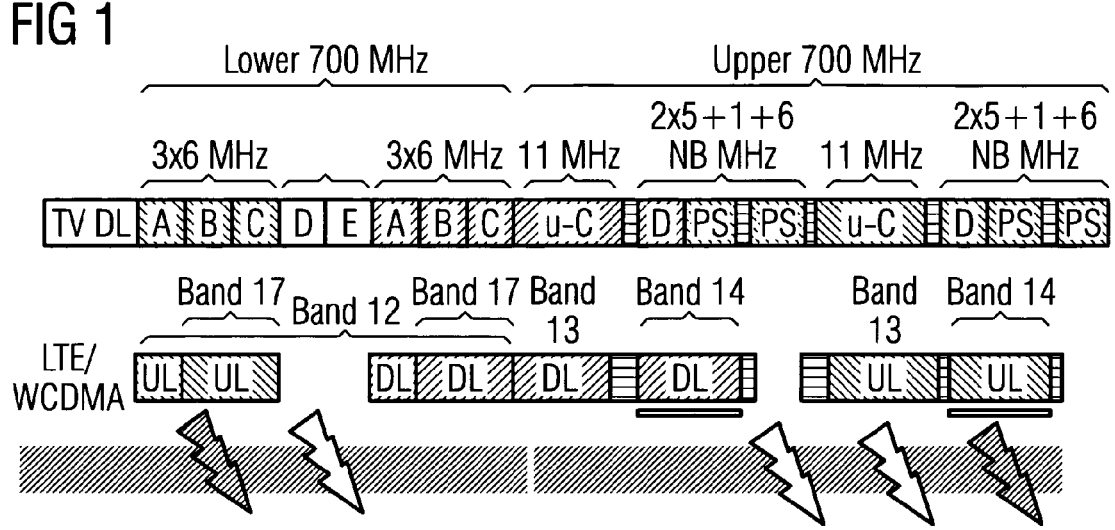
FIG. 1 illustrates the problem of intermodulation duplex interference—inter-frequency band.
Figure 2:
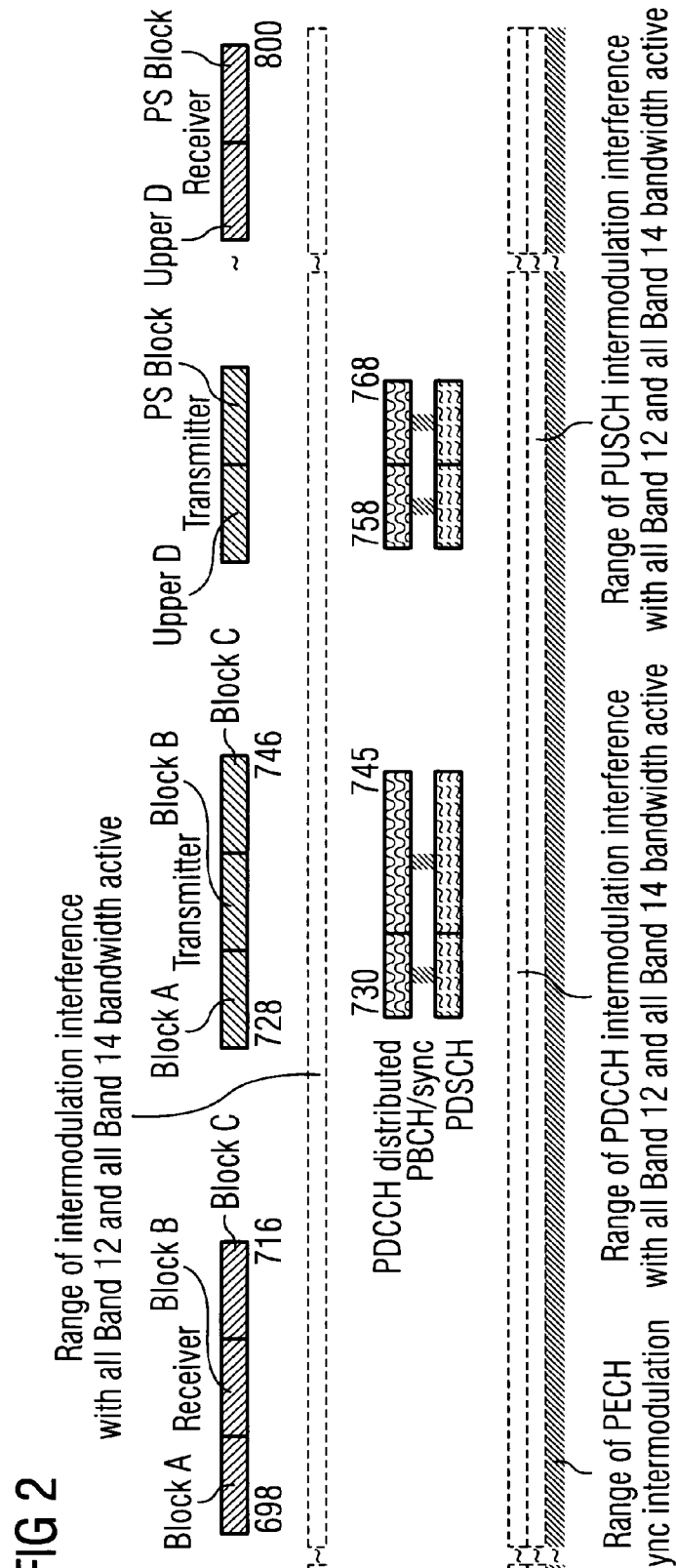
FIG. 2 illustrates frequency ranges of intermodulation effects of PDCCH, PBCH/synchronization channels, and fully allocated PDSCH.

To illustrate, FIG. 2 shows the frequency ranges of intermodulation effects of PDCCH, PBCH and synchronization channels, and fully allocated PDSCH.

In the following, according to certain embodiments of the present invention, by referring to these different channels, the various time-multiplexing muting and cross-CC scheduling steps pertaining to such certain embodiments are described in detail.

PBCH and Synchronization Channels

In order to mitigate the time-domain transmit conflict on the physical broadcast channel (PBCH) as well as the primary and secondary synchronization signals, a synchronous time shift of sub-frame numbering (SFN) of multiples of 1 ms but excluding multiples of 5 ms can be provided.

Figure 3:
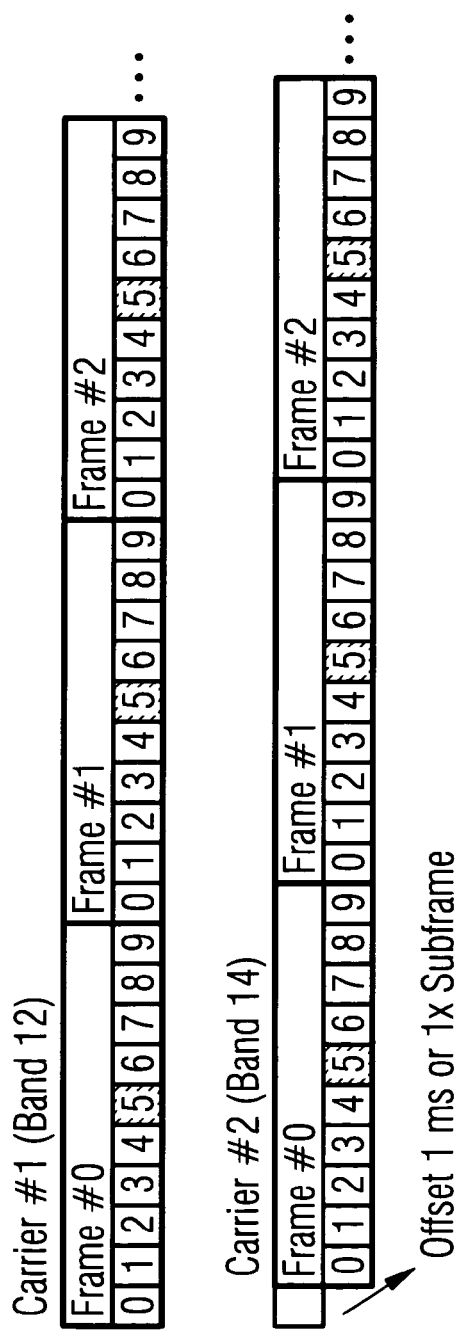
FIG. 3 shows a possible time shift for eliminating conflicts of PBCH and synchronization channels between component carriers and component carriers of different frequency bands.

FIG. 3 shows an example of such a possible time shift configuration for eliminating conflicts of PBCH and synchronization channels between component carriers and component carriers of different frequency bands.

Alternatively or in addition thereto, the PBCH and synchronization channels are muted in a time-multiplexed manner.

Specifically, the PBCH and the primary and secondary synchronization channels are time-multiplexed muted following a pattern that limits the range of $3^{rd}$ order and potentially $5^{th}$ order intermodulation interference to the duplex gap.

Figure 4:
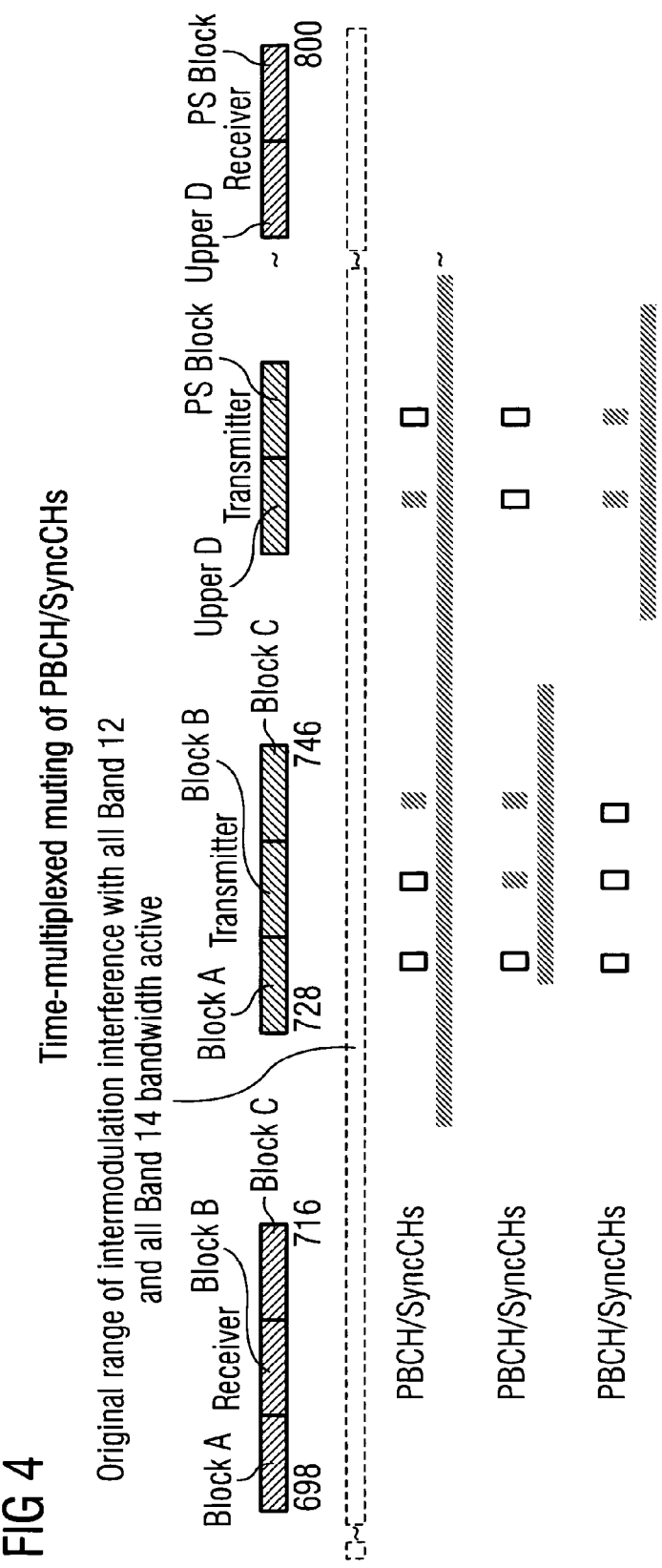
FIG. 4 shows the time-multiplexed muting of PBCH and synchronization channels according to certain embodiments of the present invention.

FIG. 4 shows an example for such a pattern with which a significantly reduced intermodulation duplex interference range is obtained (filled bars). The intermodulation duplex interference due to PBCH and primary/secondary synchronization channels does not reach the eNB receiver spectrum anymore.

PDCCH

As for LTE-Advanced carrier aggregation a synchronous operation is required, wherein OFDM symbols are synchronized down to a fraction of the cyclic prefix and first OFDM symbol are synchronized within a TTI such that PDCCH OFDM symbols are aligned, the mutually exclusive presence of PDCCH in a line of DL CCs will allow for limiting the range of $3^{rd}$ order (and $5^{th}$ order) intermodulation products and hence eliminating (reducing) duplex interference.

In detail, this can be achieved by configuring the PDCCH monitoring sets of all UEs via RRC connection reconfiguration not to contain those DL CCs that are selected not to carry any PDCCH. As a consequence, the PDSCH of this DL CC is allocated through cross-CC scheduling from a DL CC which belongs to all the PDCCH monitoring sets.

Analogously, the UL CC PUSCH is allocated through cross-CC scheduling from a DL CC which belongs to all the PDCCH monitoring sets.

As the PDCCH capacity demand on the other DL CCs which are present in all PDCCH monitoring sets of the UEs consequently increases, the network is configured with three OFDM symbols for PDCCH on all DL CCs.

As a result, there are two cases concerning the first three OFDM symbols of a TTI:

Either, the eNB does not transmit on the first three OFDM symbols of a TTI of DL CCs selected not to carry PDCCH. This limits the range of the $3^{rd}$ order intermodulation products for the first three OFDM symbols in a TTI (see FIG. 5).

Or, instead, a known optimization could allocate PDSCH on the first three OFDM symbols of the TTI.

As a consequence of the time-multiplexed configuration of PDCCH monitoring sets, also the PHICH is made subject to a time-multiplexed configuration.

For those DL CCs that are being operated without any PDCCH, there is no need to provide PHICH resources as no UL grant can origin from this DL CC and as a consequence no PHICH resources are required on this DL CC.

When eliminating a DL CC from the PDCCH monitoring sets of all RRC connected UEs according to release 10, all acknowledge/not acknowledge signaling in the PHICH is set to acknowledge thereby performing a hard termination of all UL HARQ processes. Faults introduced due to this hard termination are repaired by the higher layer ARQ.

A graceful withdrawal of the control channels from the DL CC requires completing the UL HARQ processes. As the UL HARQ process is synchronous, the eNB is capable of exactly planning the number of TTIs the completion will take. As the completion period will last in the order of 50 ms to 100 ms, a corresponding period of time must be waited before setting up control channels in another DL CC as otherwise intermodulation interference may be generated during PDCCH monitoring set reconfigurations.

While reconfiguring release 10 UEs, release 8 UEs are handedover to a carrier maintaining the DL control channels. Termination and completion of HARQ and ARQ processes then follow LTE release 8 principles.

As a further consequence of the time-multiplexed configuration of PDCCH monitoring sets, also the PCFICH is made subject to a time-multiplexed muting.

Specifically, the PCFICH information is required in order to know in which OFDM symbol the allocation of the PDSCH transport block starts. In detail, the UE gets the information that the first three OFDM symbols would have been allocated for PDCCH from the PCFICH of the DL CC that contains the cross-CC scheduled DL grant. As all UEs are configured with the same PDCCH monitoring sets at a given time, the PCFICH information of those DL CCs selected not to be part of the PDCCH monitoring sets is not needed and can be muted.

Figure 5:
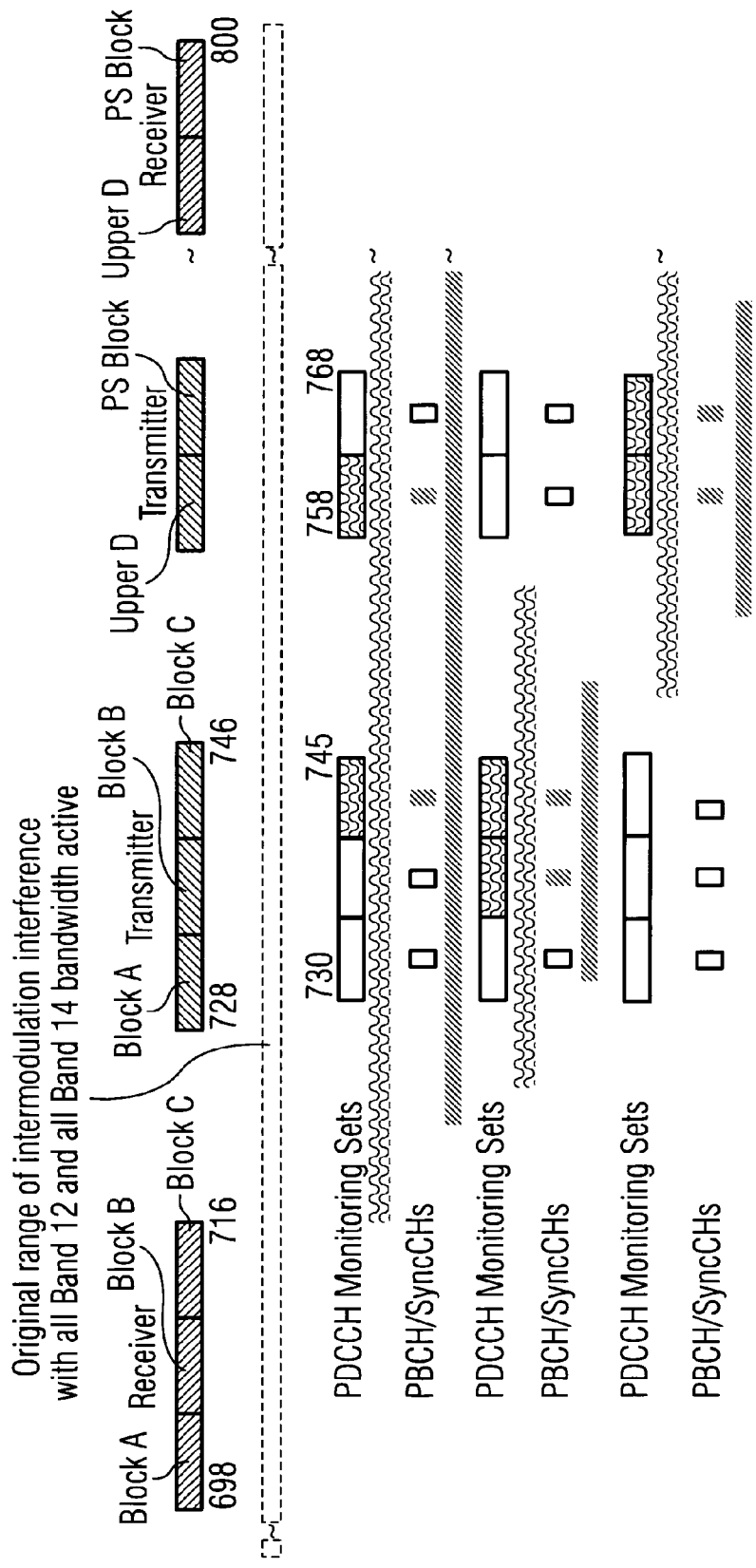
FIG. 5 shows the time-multiplexed configuration of PDCCH/PHICH/PCFICH in the first (three) OFDM symbols (combined with the time-multiplexed muting of PBCH and synchronization channels according to FIG. 3) according to certain embodiments of the present invention.

FIG. 5 shows examples of shortened intermodulation duplex interference ranges of the PDCCH/PHICH/PCFICH channels (hatched bars). That is, FIG. 5 shows the time-multiplexed configuration of PDCCH/PHICH/PCFICH in the first (three) OFDM symbols (combined with the time-multiplexed muting of PBCH/synchronization channels, see PBCH section above).

PDSCH

For the intermodulation range limitation of the PDSCH it is possible to perform a cross-CC scheduling of DL CCs time-multiplexed and/or reduced transmit power aware.

Figure 6:
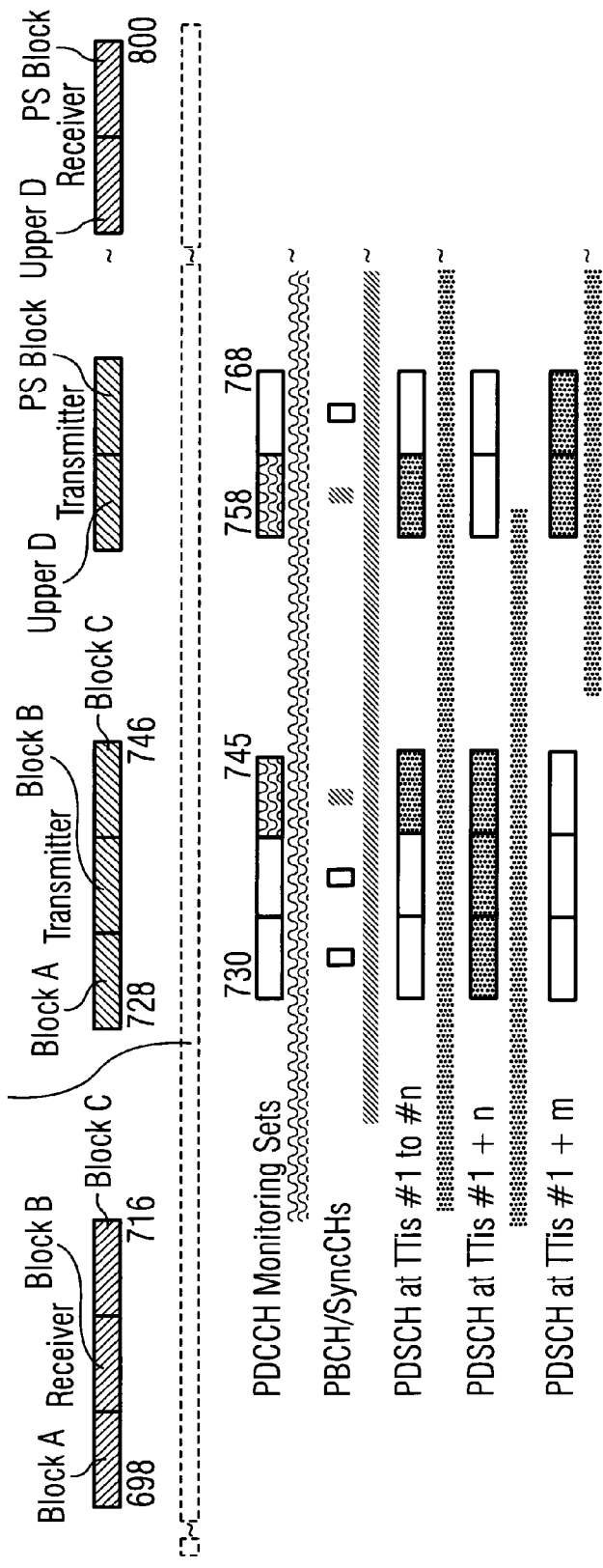
FIG. 6 shows the cross-CC scheduling adhering to DL CC PDSCH time-multiplexing rules according to certain embodiments of the present invention.

Specifically, if the DL transmission of multiple frequency bands are combined on the same antenna (as for example in the case of Band 12 and Band 14 in the U.S.), a direct method of avoiding the intermodulation duplex interference range due to PDSCH channels can be achieved as follows:

FIG. 6 shows for a given PDCCH monitoring sets configuration (see PDCCH section above), and a given PBCH/synchronization channel muting (see PCH section above), examples of suitable PDSCH allocations with limited intermodulation duplex interference range. A cross-CC PDSCH scheduling such as e.g. illustrated in FIG. 6, while adhering to a DL CC PDSCH time-multiplexing rule that at any given time the transmission configuration resulting from scheduling configuration and muting must be such that the intermodulation interference range does NOT "reach"/affect any receive spectrum portion, provides allocation freedom e.g. with respect to peak DL data rates or UE frequency band capabilities and protects the eNB receiver(s) at the same time.

The above shown allocation schemes are modified in CC granularity, i.e. in a given TTI or time period, Where either the PDSCH of a DL CC is used in full bandwidth or not used at all. Until now, it has also been assumed that the DL CC is always used at maximum eNB transmit power.

In the following section a variation of the intermodulation interference avoiding scheduling based on transmit power profiles is described.

That is, as an alternative to the above, the time-multiplexing rule can be amended or substituted by DL CC transmit power profiles. For example, the eNB does not transmit at maximum power on DL CCs close to the eNB duplex gap. Cross-CC scheduling will instead optimize PDSCH allocations with respect to UE path loss such that allocations containing a DL CC with low transmit power are reserved for UEs with little path loss and good radio conditions while allocations on DL CCs with high or maximum eNB transmit power are reserved for UEs with high path loss and bad radio conditions.

Still further, another alternative is represented by a further application of cross-CC PDSCH scheduling while adhering to the DL CC time-multiplexing rule comprising dynamic DL inter-cell interference coordination (DL ICIC).

As described above, certain embodiments of the present invention relate to an apparatus, method, system and computer program product which is configured for avoiding base station self-interference due to transmit intermodulation in carrier aggregated communication systems. Physical downlink communication channels are allocated to respective component carriers per time interval according to a communication service in which communication is performed on an aggregation of component carriers of one or more frequency band such that component carriers to be used for transmission are separated from component carriers to be used for receiving by a transmit-receive-frequency gap band. However, not all available component carriers to be used for transmission are allocated in the same time interval. Rather, in each time interval, the physical downlink communication channels to be allocated for transmission are allocated to the available component carriers to be used for transmission such that, in each frequency band, the overall emission spectrum does not reach beyond the transmit-receive-frequency gap band.

As further indicated above, implementations examples for certain embodiments of the present invention include base station equipment capable of carrier aggregation handling such as LTE/LTE-Advanced eNB, but are not limited thereto.

According to the above description, it should thus be apparent that exemplary embodiments of the present invention provide, for example from the perspective of a network element such as an evolved Node B (eNB) or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of avoiding base station self-interference due to transmit intermodulation in carrier aggregated communication systems.

Implementations of any of the above described blocks, apparatuses, systems, techniques or methods include, as non limiting examples, implementations as hardware, software, for example in connection with a digital signal processor, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
at least one processor;
non-transitory memory storing a program of instructions;
wherein the non-transitory memory storing the program of instructions is configured to, with the at least one processor, configure the apparatus to at least:
schedule allocation of physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
exclude certain component carriers of the component carriers to be used for transmission from having allocated the at least one physical channel configured for downlink control;
communicate, on a component carrier which is available, information that the excluded component carriers are not to be monitored;
allocate a physical channel configured for shared uplink use to a component carrier of the component carriers to be used for receiving;
allocate a physical channel configured for shared downlink use to a component carrier of the component carriers to be used for transmission; and
allocate, for consecutive time intervals, the at least one physical channel configured for downlink control to available component carriers of the component carriers to be used for transmission,
wherein not all of the available component carriers of the component carriers to be used for transmission are allocated in the same time interval, and
wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to prevent any intermodulation interference associated with the overall emission spectrum from extending beyond the transmit-receive-frequency gap band.

2. The apparatus according to claim 1, wherein the physical downlink communication channels comprise a physical channel for broadcast communication and a primary and a secondary synchronization channel.

3. The apparatus according to claim 1, wherein the physical downlink communication channels comprise a physical channel configured for hybrid automatic repeat request indication, and
the apparatus is further caused to exclude the certain component carriers of the component carriers to be used for transmission from having allocated the physical channel configured for hybrid automatic repeat request indication which are excluded from having allocated the at least one physical channel configured for downlink control.

4. The apparatus according to claim 1, wherein the physical downlink communication channels comprise a physical control channel configured for format indication, and
the apparatus is further caused to exclude the certain component carriers of the component carriers to be used for transmission from having allocated the physical control channel configured for format indication which are excluded from having allocated the at least one physical channel configured for downlink control.

5. The apparatus according to claim 1, wherein the physical downlink communication channels comprise the physical channel configured for shared downlink use.

6. The apparatus according to claim 5, wherein the apparatus is further caused to apply dynamic downlink inter-cell interference coordination.

7. An evolved Node B, comprising the apparatus according to claim 1.

8. An apparatus, comprising:
at least one processor;
non-transitory memory storing a program of instructions;
wherein the non-transitory memory storing the program of instructions is configured to, with the at least one processor, configure the apparatus to at least:
schedule allocation of physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
exclude certain component carriers of the component carriers to be used for transmission from having allocated the at least one physical channel configured for downlink control;
communicate, on a component carrier which is available, information that the excluded component carriers are not to be monitored;
allocate a physical channel configured for shared uplink use to a component carrier of the component carriers to be used for receiving;
allocate a physical channel configured for shared downlink use to a component carrier of the component carriers to be used for transmission; and
allocate, for consecutive time intervals, the at least one physical channel configured for downlink control to available component carriers of the component carriers to be used for transmission,
wherein not all of the available component carriers of the component carriers to be used for transmission are allocated in the same time interval with maximum transmission power, and
wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to prevent any intermodulation interference associated with the overall emission spectrum from extending beyond the transmit-receive-frequency gap band.

9. An evolved Node B, comprising the apparatus according to claim 8.

10. A method, comprising:
allocating physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
excluding certain component carriers of the component carriers to be used for transmission from having allocated the at least one physical channel configured for downlink control;
communicating, on a component carrier which is available, information that the excluded component carriers are not to be monitored;
allocating a physical channel configured for shared uplink use to a component carrier of the component carriers to be used for receiving;
allocating a physical channel configured for shared downlink use to a component carrier of the component carriers to be used for transmission; and
allocating, for consecutive time intervals, the at least one physical channel configured for downlink control to available component carriers of the component carriers to be used for transmission,
wherein not all of the available component carriers of the component carriers to be used for transmission are allocated in the same time interval, and
wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to prevent any intermodulation interference associated with the overall emission spectrum from extending beyond the transmit-receive-frequency gap band.

11. The method according to claim 10, wherein the physical downlink communication channels comprise a physical channel for broadcast communication and a primary and a secondary synchronization channel.

12. The method according to claim 10, wherein the physical downlink communication channels comprise a physical channel configured for hybrid automatic repeat request indication, the method further comprising:
excluding the certain component carriers of the component carriers to be used for transmission from having allocated the physical channel configured for hybrid automatic repeat request indication which are excluded from having allocated the at least one physical channel configured for downlink control.

13. The method according to claim 10, wherein the physical downlink communication channels comprise a physical control channel configured for format indication, and the method further comprising:
excluding the certain component carriers of the component carriers to be used for transmission from having allocated the physical control channel configured for format indication which are excluded from having allocated the at least one physical channel configured for downlink control.

14. The method according to claim 10, wherein the physical downlink communication channels comprise the physical channel configured for shared downlink use.

15. The method according to claim 14, further comprising: applying dynamic downlink inter-cell interference coordination.

16. A method, comprising:
allocating of physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
excluding certain component carriers of the component carriers to be used for transmission from having allocated the at least one physical channel configured for downlink control;
communicating, on a component carrier which is available, information that the excluded component carriers are not to be monitored;
allocating a physical channel configured for shared uplink use to a component carrier of the component carriers to be used for receiving;
allocating a physical channel configured for shared downlink use to a component carrier of the component carriers to be used for transmission; and
allocating, for consecutive time intervals, the physical channel configured for downlink control to available component carriers of the component carriers to be used for transmission,
wherein not all of the available component carriers of the component carriers to be used for transmission are allocated in the same time interval with maximum transmission power, and
wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to eliminate intermodulation interference associated with the overall emission spectrum extending beyond the transmit-receive-frequency gap band.

17. A non-transitory computer readable medium storing a program of instructions, execution of which by a processor configures an apparatus to at least:
allocate physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
exclude certain component carriers of the component carriers to be used for transmission from having allocated the at least one physical channel configured for downlink control;
communicate, on a component carrier which is available, information that the excluded component carriers are not to be monitored;
allocate a physical channel configured for shared uplink use to a component carrier of the component carriers to be used for receiving;
allocate a physical channel configured for shared downlink use to a component carrier of the component carriers to be used for transmission; and
allocate, for consecutive time intervals, the physical channel configured for downlink control to available component carriers of the component carriers to be used for transmission,
wherein not all of the available component carriers of the component carriers to be used for transmission are allocated in the same time interval, and
wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to prevent any intermodulation interference associated with the overall emission spectrum from extending beyond the transmit-receive-frequency gap band.

18. A non-transitory computer readable medium storing a program of instructions, execution of which by a processor configures an apparatus to at least:
allocate physical downlink communication channels, at least one physical channel of the physical downlink communication channels being configured for downlink control to respective component carriers per time interval according to a communication service in which communication is performed on an aggregation of component carriers of one or more frequency bands such that component carriers to be used for transmission are separated from component carriers to be used for receiving by a transmit-receive-frequency gap band;
exclude certain component carriers of the component carriers to be used for transmission from having allocated the at least one physical channel configured for downlink control;
communicate, on a component carrier which is available, information that the excluded component carriers are not to be monitored;
allocate a physical channel configured for shared uplink use to a component carrier of the component carriers to be used for receiving;

allocate a physical channel configured for shared downlink use to a component carrier of the component carriers to be used for transmission; and allocate, for consecutive time intervals, the physical channel configured for downlink control to available component carriers of the component carriers to be used for transmission, wherein not all of the available component carriers of the component carriers to be used for transmission are allocated in the same time interval with maximum transmission power, and wherein, in each time interval, the physical downlink communication channels to be allocated for transmission are allocated to the available component carriers of the component carriers to be used for transmission such that, in each frequency band, an overall emission spectrum does not reach beyond the transmit-receive-frequency gap band, so as to prevent any intermodulation interference associated with the overall emission spectrum from extending beyond the transmit-receive-frequency gap band.

* * * * *